Figure 1:
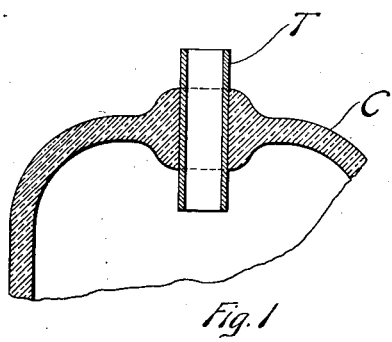

C. A. KRAUS.
CONDUCTING SEAL FOR VACUUM CONTAINERS.
APPLICATION FILED APR. 5, 1912.

1,093,997.

Patented Apr. 21, 1914.

UNITED STATES PATENT OFFICE.

CHARLES A. KRAUS, OF NEWTON HIGHLANDS, MASSACHUSETTS.

CONDUCTING-SEAL FOR VACUUM-CONTAINERS.

1,093,997.  Specification of Letters Patent.  Patented Apr. 21, 1914.

Application filed April 5, 1912. Serial No. 688,815.

*To all whom it may concern:*

Be it known that I, CHARLES A. KRAUS, a citizen of the United States, and resident of Newton Highlands, in the county of Middlesex and State of Massachusetts, have invented new and useful Improvements in Conducting-Seals for Vacuum-Containers, of which the following is a specification.

My invention relates to the construction of vacuum containers for vacuum electric apparatus, such as vapor lamps and vapor rectifiers, and has particularly to do with the sealing in of the conductor through which current may be led to the interior of the vacuum container.

In the active development of various types of vacuum electric apparatus glass has for the most part been employed as the material for containers. As such apparatus must be capable at times of carrying considerable current and operating at high temperatures, the maintenance of a vacuum tight seal between the glass container and the conductive leads has presented considerable difficulties which have been met in part in commercial practice only by the employment of platinum wires of small diameter sealed in lead glass, the coefficients of expansion of this glass and metal being substantially the same. Seals made in this manner are by no means wholly satisfactory even within the recognized practical limits to their construction and employment. Only with platinum wires of small diameter is it possible to make a fairly workable sealed joint with lead glass; in order to obtain larger current carrying capacity than is possessed by the largest possible sealed in platinum wire, the constructors of vacuum electric apparatus have sometimes resorted to the costly and unreliable expedient of multiple leads of small platinum wire. A metal lead sealed to a vitreous body having the same coefficient of expansion as the metal presents inherent defects which become fatal as soon as any attempt is made to use a lead of large current capacity. The metal lead is a good conductor of heat, the surrounding container material is a very poor conductor. When the metal selected for a lead-wire has about the same coefficient of expansion as the container-material, as in the case of platinum and lead glass, and the seal is made in the usual manner, the two materials cool together substantially at the same rate, so that when cold, the joint is perfectly tight, and subject to no appreciable strains. But when the lead-wire is heated by its own electrical resistance supplemented by conduction of heat back from the electrode which it feeds, its superior heat-conductivity as compared with the container material causes it to put an expansive strain on the conductor, a strain of the character such material is least effective to resist, so that the heated lead-wire may, as it often does, disrupt the container material and destroy the seal. Thus the condition presented by equal coefficients of expansion in the metal and the container is inherently vicious.

It will be perceived that if a leading-in conductor sealed in the wall of a container has a higher coefficient of expansion than the container, then when the seal is made by heat in the usual way and allowed to cool, the metal will be in a state of internal tension, if we assume that the union between it and the container is sufficiently tenacious to resist separation by rupture of the joint itself. The decline of temperature after the joint is made will, as the container-material becomes rigid, produce tension between the metal and the container at the joined surfaces, and internal tension in the metal which must stretch, if the joint is to be maintained. If now the temperature of such a leading-in wire be raised by the electrical operation of the vacuum apparatus, the consequent expansion of the metal will simply relieve this tension, reduce the statically operating forces and will therefore tend to make the seal even more effective and safer than when the apparatus was inactive. If a seal of this type gives way at all, it will be either when it is cooling after the process of manufacture, or at some time when the apparatus is not in use. Thus, the efficiency of such a seal is tested simply by having the apparatus in stock, whereas such seals as platinum and lead glass can be tested only by operation, which is more expensive. In practice, however, a seal between a metal wire of relatively high coefficient of expansion as compared with the container material has been found unreliable, since the union between the two members is seldom sufficiently tenacious to withstand the contractile force exerted by the cooling metal. The container material itself is not ruptured, but the joint is broken.

My invention furnishes a means for practically and effectively reconciling the conflicting conditions which have heretofore prevented the employment of metals of relatively high coefficients of expansion for leading-in wires for vacuum apparatus, and furthermore makes it possible to employ leads of far greater current-carrying capacity than have heretofore been possible under the known structural conditions.

While with a solid wire of relatively high coefficient of expansion the junction with the container material is usually ruptured by the contractile force of the cooling metal, it is obvious that if by some means the tenacity of the union between the metal and the container could be made predominant and capable of successfully resisting the joint-rupturing strain due to the cooling of the metal, in other words, could be made so tenacious as to stretch the metal rather than loose its hold, then we should have a seal for leading-in wires sufficiently stable to endure during quiescence of the apparatus, and more stable during electrical operation of the apparatus. Such means are provided by my invention, which is illustrated in the drawings hereto annexed, in which,—

Figure 2:
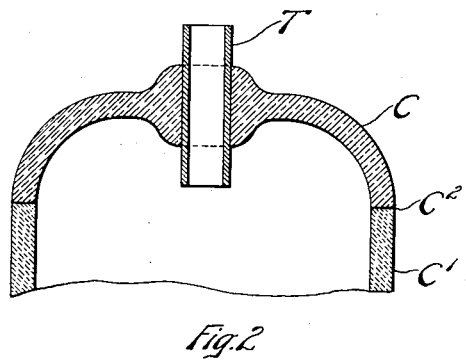

Figure 1, shows a portion of a vacuum-electric container and a metallic sealing tube; Fig. 2, a portion of a quartz container, with a glass sealing portion, and metallic sealing tube; and Fig. 3, a portion of a vacuum electric container, metallic sealing tube, and an electrode lead which serves to close the tube.

Figure 3:
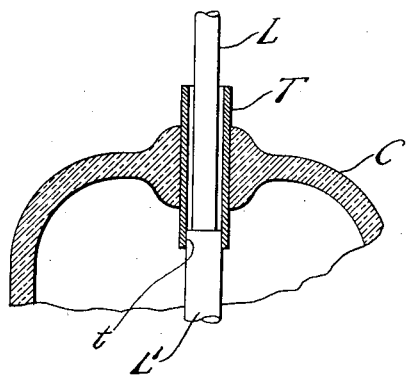

Assume the container C (Fig. 1) to be composed of a suitable glass. A tube T, of metal, which may be copper, silver, or any metal which has a higher coefficient of expansion than the material of the container C, is sealed into the container by heat in the usual manner. The metal of which the tube T is composed should be highly ductile, elastic, or rather plastic, and for this purpose a metal of high purity, free from alloys and impurities which render it hard and rigid is strongly to be recommended. If this recommendation as to purity be observed, many metals heretofore regarded as useless for the purpose may be employed with success. For all practical purposes copper is to be recommended, since it may easily be obtained in a sufficiently pure condition, and is an admirable conductor of electricity and therefore of great utility as a leading in conductor as well as a member of a seal. The dimensions and elastic constants of the tube should be so determined that when the joint between the tube and the container cools, the metal will assume a condition of static tension rather than relinquish its hold on the container-wall. Thus the factors which govern the selection of proportions of the tube are the thickness of the tube wall and the elasticity of the metal, or its inherent capacity to resist tensile stress. Again, the joint involves a tubular metal member, in contact with the container on one side only of the tubular wall. Any arrangement or shape which involves embracing both sides of a solid portion of metal is to be avoided, for reasons hereinabove set forth. If the metal is pure, either platinum, copper, or silver or gold may successfully be employed. Tubes of from one to two mm. diameter may have walls .05 to .02 mm. thick. Larger tubes may safely be given thicker walls, since their higher contractile effort is balanced by a larger surface of tenacious contact with the container. The electric carrying capacity of such a tube is greater in practice than that of a solid wire or rod of equal cross-sectional metal area. If desired, the carrying capacity of the lead may be increased by welding or brazing a solid lead-rod such as L L' to the tube T as at $t$, as indicated in Fig. 3; care being taken to reduce the diameter of the lead rod so that it is spaced from the interior of the tube T along the joint, as at L.

Ordinarily, the tube T may be itself used as the current carrying member, by sealing it at one end, welding or brazing the end to close it hermetically.

If fused quartz containers are used, as C' in Fig. 2, a sealing cap of glass, C, will be fused to the quartz as at $C^2$, and the metal tube T sealed into the glass as above described.

At ordinary temperatures, when the apparatus is not in use, the joint between the tube T and container C will be under tension, and the metal of the tube T held in a condition of tensile strain. The stresses at the joint are greatest under these conditions; when the tube T becomes heated by use of the apparatus, and holds a temperature higher than the surrounding material, its tendency to expansion as a whole, reduces the strain on the joint which then becomes more stable and reliable at the very time when its reliability is most in demand. As the joint was made by rendering the container material plastic, it is obvious that no condition of use can so expand the metal tube as to exert a disruptive strain on the container.

Whatever may be the specific nature or composition of the vitreous non-conducting material which forms one member of the joint, and whatever be the metal selected for the tubular inner member, the materials are so selected that the outer non-conducting member of the joint shall have a lower coefficient of expansion than the inner tubular conductive member which is sealed through the outer member. This is the condition which insures a joint under compression during the maintenance of the relatively high temperatures incident to use of the apparatus to which the joint or seal is an adjunct, and which, under the relatively moderate stresses which supervene at the lower temperatures prevailing while the apparatus is not used, provides adhesion between the members sufficiently strong to hold the metallic tubular inner member under internal tension without rupture of the joint.

What I claim and desire to secure by Letters Patent is:

1. The combination with a vacuum-container of non-conducting material, of a tube of conductive material sealed through the container-wall, the coefficient of thermal expansion of the tube being greater than that of the container material.

2. The combination with a vacuum-container of non-conducting material, of a tube of conductive material sealed through the container-wall and in contact therewith on one side only of the tube-wall, the coefficient of thermal expansion of the tube being greater than that of the container-material.

3. The combination with a vacuum-container of non-conducting material, of a tube of conductive material sealed through the container-wall, the coefficient of thermal expansion of the tube being greater than that of the container-material, the proportions of the tube and the tenacity of contact with the container being such as to maintain the material of the tube under tension under conditions of uniform normal temperature.

4. The combination with a vacuum-container of non-conductive material, of a tube of conductive material passing through and fused to the container wall, the coefficient of thermal expansion of the tube being greater than that of the container-material, and the material of the tube having such plasticity that its contractile effort under normal temperature conditions is resistible by the adhesive strength of contact with the container wall.

5. In a seal, a member of non-conducting material and a tube of conductive material sealed through the non-conducting member, the coefficient of thermal expansion of the tube being greater than that of the member through which it is sealed.

6. In a seal, a member of non-conducting material, a tube of conducting material sealed through the non-conducting member and in contact therewith on one side only of the tube-wall, the coefficient of thermal expansion of the tube being greater than that of the member through which it is sealed.

7. In a seal, a member of non-conducting material, a tube of conducting material sealed through the non-conducting member, the coefficient of thermal expansion of the tube being greater than that of the non-conducting member, the proportions of the tube and the tenacity of contact with the non-conducting member being such as to maintain the material of the tube under tension, under conditions of uniform normal temperatures.

8. In a seal, a member of non-conducting material, a tube of conducting material passing through and fused to the non-conducting member, the coefficient of thermal expansion of the tube being greater than that of the non-conducting member, and the material of the tube having such plasticity that its contractile effort under normal temperature conditions is resistible by the adhesive strength of contact with the non-conducting member.

Signed by me at Boston, Massachusetts, this 18th day of March 1912.

CHARLES A. KRAUS.

Witnesses:
ODIN ROBERTS,
CHARLES D. WOODBERRY.